US007828995B2

(12) United States Patent
Kruse et al.

(10) Patent No.: US 7,828,995 B2
(45) Date of Patent: Nov. 9, 2010

(54) COMPOSITION FOR A FIRE-PROTECTION AGENT FOR MATERIALS AND FIRE-PROTECTION METHOD

(75) Inventors: Dirk Kruse, Braunschweig (DE); Sebastian Simon, Braunschweig (DE); Klaus Menke, Bruchsal (DE); Stefan Friebel, Evessen (DE); Volker Gettwert, Neuhofen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 330 days.

(21) Appl. No.: 10/595,231

(22) PCT Filed: Oct. 1, 2004

(86) PCT No.: PCT/DE2004/002191

§ 371 (c)(1),
(2), (4) Date: Mar. 28, 2006

(87) PCT Pub. No.: WO2005/033232

PCT Pub. Date: Apr. 14, 2005

(65) Prior Publication Data

US 2007/0051271 A1 Mar. 8, 2007

(30) Foreign Application Priority Data

Oct. 2, 2003 (DE) .................. 103 45 935
May 7, 2004 (DE) ............. 10 2004 023 166

(51) Int. Cl.
*C09K 21/00* (2006.01)
*C09K 21/02* (2006.01)
*C09K 21/04* (2006.01)

(52) U.S. Cl. ............... 252/606; 106/15.05; 106/18.11; 106/18.12; 106/18.13; 106/18.14; 106/18.15; 106/18.16; 106/18.21; 252/601; 252/607; 252/608; 252/610; 252/611

(58) Field of Classification Search .............. 106/15.05, 106/18.11, 18.12, 18.13, 18.14, 18.15, 18.16, 106/18.21; 252/601, 607, 609, 610, 611, 252/606

See application file for complete search history.

(56) References Cited

U.S. PATENT DOCUMENTS

| 4,879,320 A | * | 11/1989 | Hastings | ..................... 523/179 |
| 4,965,296 A | * | 10/1990 | Hastings | ..................... 523/179 |
| 5,749,948 A | * | 5/1998 | Scholz et al. | ............ 106/18.15 |
| 5,817,369 A | * | 10/1998 | Conradie et al. | ......... 427/389.9 |
| 6,251,961 B1 | | 6/2001 | Pirig et al. | |
| 6,620,349 B1 | | 9/2003 | Lopez | |
| 2004/0110870 A1 | * | 6/2004 | Liu | ........................... 523/179 |

FOREIGN PATENT DOCUMENTS

| DE | 19826780 A1 | * | 12/1999 |
| EP | 0 878 520 | | 11/1998 |
| GB | 2272444 A | * | 5/1994 |
| JP | 4-249550 A | * | 9/1992 |

OTHER PUBLICATIONS

Machine Translation of EP878520A (111/1998).*
Translation of German Patent Specification No. DE 19826780A1 (Dec. 1999).*

* cited by examiner

*Primary Examiner*—Anthony J Green
(74) *Attorney, Agent, or Firm*—Whitham Curtis Christofferson & Cook, PC

(57) ABSTRACT

The invention relates to novel compositions for fire-protection agents for materials, to a method for treating materials for protection against fire, and to the use of the compositions as fire-protection agents. More precisely, the invention relates to compositions for a fire-protection agent, such as a fire-protection paint, for materials, characterized in that ceramizing additives and volume-builders are contained as ingredients.

7 Claims, No Drawings

COMPOSITION FOR A FIRE-PROTECTION AGENT FOR MATERIALS AND FIRE-PROTECTION METHOD

The present invention relates to new compositions for fire-protection agents for materials, to methods of treating materials for fire protection, and to the use of compositions as fire-protection agents. More precisely the present invention relates to compositions for a fire-protection agent, such as a fire-protection paint, for materials, characterized in that its ingredients include ceramic-forming additives and volume-formers.

PRIOR ART

The protection of materials and components in the event of fire against temperature exposure is a customary method as part of constructional fire protection.

In principle there are three known possibilities available for this purpose. Material and components can be clad with or encased in incombustible materials, such as gypsum fiberboard or gypsum plasterboard panels, in order to retard the access of temperature to the component in the event of fire. This route is generally employed in steel construction and wooden construction. The second possibility is the application of protective paints, which expand in the event of fire and produce physical temperature protection.

U.S. Pat. No. 4,965,296 describes a flame-retardant material which is composed of a flame-retardant coating material and an electrically conductive material. The flame-retardant coating material in this system is composed of foam-forming and carbon-forming substances, a gas-generating compound, a film-forming binder, and corresponding solvents. Optionally it is possible for customary further ingredients to be present.

U.S. Pat. No. 4,879,320 describes a similar, flame-retardant composition to which, however, a ceramic fiber material has been added, rather than a conductive material. U.S. Pat. No. 5,225,464 describes an aqueous intumescent formulation which is based on a reaction product of phosphoric acid, melamine, and monoammonium phosphate and which together with pentaerythritol, chlorinated hydrocarbons, and further compounds, especially polyvinyl acetate, is said to provide an improved intumescent coating material. DE 42 18 184 A1 describes an aqueous binder mixture composed of an aqueous solution and/or dispersion of a combination of a) at least one NCO prepolymer with blocked isocyanate groups that contains urethane groups and is dispersible and/or soluble in water in the presence of component b), and b) a polyamine component composed of at least one (cyclo)aliphatic polyamine, containing at least two primary and/or secondary amino groups. DE 43 43 668 describes expandable flame-retardant coating compositions composed at least of:

4% to 25% by weight of a film-forming binder

10% to 40% by weight of ammonium polyphosphate

8% to 40% by weight of at least one substance which carbonizes on exposure to heat 6% to 25% by weight of a blowing agent 0% to 51% by weight of dispersants, and 0% to 25% by weight of fillers.

DE 199 09 387 A1 describes a fire-protection coating which forms an insulating layer and is based on substances which form carbon and form a foam layer in the event of fire, film-forming binders, blowing agents, and customary auxiliaries and additives, characterized in that said coating comprises melamine polyphosphate as a blowing agent. The insulating-layer-forming fire-protection coating described in that specification is stable in particular under tropical conditions (up to 100% relative atmospheric humidity, approximately 75° C.), which is to say that under those conditions its $NH_3$ release is extremely low.

A feature common to the prior-art citations is that they are unable to prevent the ignition of combustible substrates. Primarily, therefore, they are used in order to increase the fire resistance time, i.e. the period between the beginning of fire and structural failure of components. Here they have acquired a certain significance in connection with the coating of steel, which in the absence of protection has only a low fire resistance time. Their significance in the case of the coating of wood is lower by comparison. Assignment of woods thus coated to building-material class B1 in accordance with DIN 4102 is achievable. The coatings described develop a light carbon foam which is hardly able to present resistance to external forces.

A further critical disadvantage of the available carbon foam-formers are the limiting service properties of such paints. Thus, conventional fire-protection paints are approved exclusively for use under dry conditions. They lack sufficient durability under climatic exposure, are instantly dissolved by moisture, and are too soft to be used on floors or comparable components.

A third possibility is the addition of flame retardants, which are employed predominantly for imparting fire protection to plastics and to some extent to wood materials and paper materials. Flame retardants are chemical substances which reduce either flammability and/or combustibility or increase the fire resistance time of the material or component. This is achieved as a result of the following chemical and/or physical processes:

reducing heat supply by the addition of substances which decompose in a strongly endothermic process and, in so doing, generate incombustible gases which additionally stem the flames (e.g., aluminum hydroxide, magnesium hydroxide). Energy-consuming fire-protection agents;

smothering flames by evolution of chemical substances which bind the H and OH radicals. Fire-smothering fire-protection agents;

limiting heat flow by creation of an insulating layer at the surface. Fire-protection agents which promote charring, form barrier layers, and form insulating layers.

Generally speaking, modern-day fire-protection agents will function in accordance with two or more of these principles.

Finally EP 878 520 describes a composition for refractory coatings which form ceramic by pyrolysis. The compositions described therein lead to ceramic-forming coatings which develop on the material. Nevertheless, the coats which are developed are insufficient to meet the requirements in respect of the fire-protection requirements, in the wood sector, for example.

It was an object of the present invention, therefore, to provide a composition which overcomes the abovementioned disadvantages and which in particular prolongs the period of the protective effect, while at the same time also satisfying the other requirements which arise in the respective fields of application. These requirements are for example, in the context of use on wood in interiors, essentially as follows: transparency, scratch resistance and abrasion resistance, moisture resistance, light fastness, environmental compatibility, et cetera. In exterior application, in contrast, the following properties are needed: exterior weathering stability, low soiling, moisture protection, UV protection, expandability.

DESCRIPTION OF THE INVENTION

The present invention is therefore directed to a composition for a fire-protection agent for materials, characterized in that its ingredients include ceramic-forming additives and volume-formers.

In a more preferred embodiment the ceramic-forming additives in this case are in powder form.

Preferably the ceramic-forming additives comprise at least two of the compounds from disodium tetraborate, e.g. borax, ammonium pentaborate, $TiO_2$, $B_2O_3$ and $SiO_2$. Further ceramic-forming additives (also referred to as glass-formers or ceramic-formers below) which can be used in accordance with the invention comprise $KAlSO_4$, ammonium pentaborate, $Na_2CO_3$, CaO, SiC. Particular preference is given to a combination of ammonium pentaborate and disodium tetraborate.

The composition of the invention for a fire-protection agent for materials further comprises a volume-former. In the present application, volume-formers are understood to be agents which act as blowing agents and whereby, in the event of heating, the volume of the layer formed by the fire-protection agent is increased. The increase in volume which occurs in this case is preferably at least 500%, more preferably at least 1000%, such as at least 4000% or more, when the fire-protection agent is exposed to heating. This heating must be, for example, at least 100° C. Volume-formers include gas-formers, which are used alone or in combination with acid-formers. Gas-formers are common knowledge in the literature, representatives included here by way of example being: $NH_4Cl$, $NaHCO_3$, melamine phosphate, melamine, and melamine-coated ammonium polyphosphate. Examples that may be mentioned of acid-formers include the following: melamine phosphate, aluminum sulfate, ammonium sulfate, ammonium polysulfate, ammonium monophosphate, and Exolit 422 (trade name of Clariant, Germany).

Auxiliaries may likewise be present in the composition of the invention; representatives of auxiliaries that may be mentioned here include, by way of example: $KAlSO_4$, $Al(OH)_3$, aluminum sulfate, pentaerythritol, dipentaerythritol.

The composition of the invention allows a ceramic coat of great density to develop on heating. The increase in thickness of the ceramic coat that is achieved by virtue of the composition of the invention makes it possible to protect coatable materials and components from unwanted heating for a relatively long time.

In other words, the ceramic-forming composition which forms an insulating layer undergoes alteration as a result of changes in the ambient conditions. In the present case, as a result of an increase in temperature, and when a limit temperature is exceeded, an increase in volume is brought about—for example, a voluminous carbon layer is developed. The temperature range within which protection begins can be regulated within a range from 110° C. to 220° C. by means, for example, of combining the individual components. This allows a ceramic coat to be developed with high strength and high thermal insulation capacity in conjunction with high coat thickness. Hence the material is protected against unwanted heating for a relatively long time.

The development of the desired volume of the insulating layer or fire-protection coat can be achieved through the formation of a carbon foam or through the use of other blowing agents.

The invention is therefore directed on the one hand to compositions for fire-protection agents for materials composed of conventional intumescent carbon foam-formers. It is possible to add ceramic powders, i.e., ceramic-forming additives, to the conventional intumescent carbon foam-former in order to give a composition of the invention.

On the other hand the present invention is also directed to compositions which comprise other volume-developing agents, such as aluminum hydroxide. In this case a voluminous ceramicized coat is obtained.

In accordance with the invention, then, it is possible to use ceramic-forming (ceramicizing) additives as an addition to existing insulating protectants/carbon foam-formers. Alternatively, the composition of the invention allows the development of an insulation-protectant coat through use of other blowing agents.

A composition of the invention is for example (all percentages below are in percent by weight, unless indicated otherwise).

3% to 30% by weight of a film-forming binder based on a polybutadiene resin

0% to 2% by weight of a crosslinker

20% to 55% by weight of an additive which is vitrifying/ceramicizing on exposure to heat 4% to 25% by weight of a blowing agent 0% to 51% by weight of dispersants 0% to 25% by weight of fillers 0% to 25% by weight of pigments 0% to 25% by weight of defoamers 0% to 25% by weight of inorganic salts 0% to 25% by weight of flow control additives.

A further composition of the invention is composed of:

30% to 70% by weight of a solvent-free, silane/siloxane-based silicone microemulsion, preferably 40% to 62%, more preferably 50% to 56%

3% to 30% by weight of a film-forming binder based on a polybutadiene resin, preferably 4% to 20%, more preferably 6% to 10%

0% to 2% by weight of a crosslinker based on a dicyanate

20% to 55% by weight of an additive which is vitrifying/ceramicizing on exposure to heat, preferably 30% to 44%, more preferably 35% to 38%

4% to 25% by weight of a blowing agent

0% to 51% by weight of dispersants

0% to 25% by weight of fillers

0% to 25% by weight of pigments

0% to 25% by weight of defoamers

0% to 25% by weight of flow control additives

0% to 25% by weight of (inorganic) salts.

A further embodiment of the invention comprises:

30% to 40% by weight of a mixture of different resins based on formaldehyde-urea resins 6% to 13% by weight of an additive which is vitrifying/ceramicizing on exposure to heat 10% to 18% by weight of an ammonium polyphosphate 5% to 10% by weight of a blowing agent 30% to 40% by weight of a partial phosphoric ester 0% to 25% by weight of pigments 0% to 25% by weight of defoamers 0% to 25% by weight of flow control additives 0% to 10% by weight of further, customary additives.

The additive which is ceramicizing/vitrifying on exposure to heat is one comprising 12% to 88% disodium tetraborate, 12% to 88% $B_2O_3$ and/or 12% to 88% $SiO_2$.

The additive may further comprise other glass-formers and/or ceramic-formers, such as $Na_2CO_3$, $KAlSO_4$, ammonium pentaborate, CaO, SiC.

If ceramic-forming additives are added as an additive to conventional intumescent carbon foam-formers, the composition of said additive is in one preferred embodiment:

25% to 40% of ammonium polyphosphate

20% to 26% of melamine

5% to 15% of $SiO_2$, and

5% to 35% of disodium tetraborate.

In another embodiment said additive is:

12% to 88% by weight of disodium tetraborate and

12% to 88% by weight of $B_2O_3$

A preferred additive in this case is:

25% to 40% of ammonium polyphosphate

20% to 26% of melamine

5% to 15% of $SiO_2$

5% to 35% of disodium tetraborate

0% to 5% of CaO

0% to 25% of pentaerythritol

5% to 25% of $B_2O_3$, and

0% to 10% of SiC.

Another preferred embodiment is:

12% to 55% of disodium tetraborate

12% to 55% of $B_2O_3$

0% to 30% of melamine

0% to 50% of ammonium polyphosphate

0% to 15% of $SiO_2$

0% to 15% of CaO

A particularly preferred embodiment is:

10.0% of disodium tetraborate 10.0% of $B_2O_3$ 5.3% of $SiO_2$ 2.7% of CaO 2.7% of SiC 30.0% of Exolit 422

20.0% of melamine 19.3% of pentaerythritol.

In the abovementioned preferred embodiments it is possible for pentaerythritol, if present, to be replaced by dipentaerythritol. The same applies to ammonium polyphosphate, which can be replaced by ammonium monophosphate.

A further preferred embodiment comprises paints based on formaldehyde-melamine resin, such as, for example, one following preferred embodiment:

20-30% by weight of formaldehyde-melamine resin 30-50% by weight of partial phosphoric esters 0-1% by weight of defoamers 0-20% by weight of borates 0-20% by weight of silicates 0-20% by weight of silicone rubber 0-2% by weight of SiC 0-10% by weight of $SiO_2$ 0-5% by weight of further additives A further possibility is a silicone rubber-based coating, such as a composition including the following constituents:

40-80% by weight of silicone rubber 0-40% by weight of phosphoric esters 0-40% by weight of borates As coatings for the exterior sector it is possible to conceive MDI-based coatings, such as coatings having the following composition:

20-40% by weight of MDI-based prepolymer 10-20% by weight of waterglass 10-40% by weight of borates 0-15% by weight of phenolic resin 0-1% by weight of SiC 0-10% by weight of $SiO_2$ 0-0.5% by weight of $TiO_2$ 0-20% by weight of cocatalysts, diluents, plasticizers The above composition can be added as an additive to conventional coating compositions for the exterior sector.

Finally the ceramic-forming additives and volume-formers may also be added to conventional radiation-curable coating systems. Mention may be made here, by way of example, of a radiation-curable coating system that can be cured using UV radiation:

20% to 65% by weight of Ebecryl 284

10% to 30% by weight of Ebecryl 1039

5% to 30% by weight of Ebecryl 8804

4% to 20% by weight of Ebecryl 1259

0.1% to 0.5% by weight of Tego Wet KL 245

1% to 6% by weight of photoinitiator

0% to 10% by weight of further, customary additives

To the abovementioned radiation-curable coating composition it is possible to add the aforementioned additives, for example, with a fraction of 30% to 55% by weight, based on the fraction of the UV coating material.

As dispersants, pigment, defoamers, and flow control additives, substances were used of the kind customarily used for paints, coating materials, and fire-protection agents.

The constituents of the ceramic-forming additive are preferably finely ground before being dispersed in the other constituents of the fire-protection agent; for example, the constituents are ground in a ball mill in the absence of moisture for 0 to 3 days prior to dispersion. This is followed by incorporation of the powder mixture by dispersion into the further constituents of the fire-protection agent. The preferred embodiment of the fire-protection agent thus comprises ceramic-forming additives in powder form.

In one preferred embodiment the individual constituents, and especially the constituents of the acid-formers and/or gas-formers, are in nanoencapsulated form; for example, the individual constituents may be present in the form of salts having particle sizes of 1 to 50 μm which have been coated with nanoparticles. This coating or encapsulation takes place with carnauba wax or $SiO_2$ for example, by known methods. The method includes, for example, a physical method. In that case the gas-formers and/or acid-formers are preferably in a form in which they are encased or encapsulated with nanoparticles. In particular, ammonium chloride may be coated with carnauba wax, ammonium chloride with $SiO_2$, diboron trioxide with carnauba wax, diboron trioxide with $SiO_2$, sodium hydrogencarbonate with carnauba wax, sodium hydrogencarbonate with $SiO_2$, ammonium sulfate with carnauba wax, ammonium sulfate with $SiO_2$, potassium aluminum sulfate×18 $H_2O$ with carnauba wax, potassium aluminum sulfate×18 $H_2O$ with $SiO_2$, calcium oxide with carnauba wax, calcium oxide with $SiO_2$. This makes it possible, among other things, for the coated substances to be less sensitive to water and to pH. As a result it is possible, for example, for no prior reactions to take place during storage of the composition.

A further substantial advantage of encapsulating or encasing the gas-formers and/or acid-formers in particular is that these substances can be combined with further components in a composition whose combination would be otherwise impossible, for reasons of incompatibility. By way of example mention may be made here of the use of acid-sensitive components in acidic resins.

Moreover, the encapsulation or encasing of the constituents of the compositions of the invention allows certain constituents of the compositions to react with one another at precisely defined times. In the present case, for example, the use of encapsulation or encasing of the gas-formers and/or acid-formers allows the reaction of these compounds to be regulated. In the case of fire-protection agents, temperature control, in particular, is required. Encapsulation with carnauba wax, for example, which begins to melt above about 72° C., allows the gas-formers and/or acid-formers not to react until above about 100° C. and hence the beginning of the development of the voluminous protective coat. The regulable temperature range within which protection is built up is preferably situated in the range from 110° C. to 220° C. This system, depicted above, therefore allows the development of intelligent coating systems and combinations of substances in compositions which would otherwise be impossible, owing to incompatibilities between the individual components.

In one further embodiment of the invention the solid constituents in the composition are present as nanoparticles having an average particle size of 1 to 150 nm, preferably 4 to 120 nm. Using these nanoparticles makes it possible to produce transparent dispersion coatings, such as transparent varnishes.

The fire-protection agents of the invention are notable, for example, for the fact that the surface temperature of the substrate after a period of 180 minutes' fire exposure, according to unit temperature, is below 300° C. Moreover, the paint coat is climatically resistant in accordance with prEN 927-6.

The expandability value of the coating is, for example, 60% or more.

The ceramic additives and/or volume-formers can also be incorporated into other materials. These further materials include polymers, cable sheathings, etc. Incorporation into other materials, such as wood materials, extruded materials, wood-plastic composites, CFP, and concrete is likewise possible. Incorporating ceramic additives and/or volume-formers into cable sheathings, for example, allows the provision of increased insulation-protectant coats in the case of cables, for which fire protection of this kind has not hitherto been possible.

The present invention is based on the finding that the development of voluminous ceramic layers, which if appropriate constitute a hybrid system of carbon foam and ceramic coat, allows improved protection of materials against unwanted heating.

Above a defined elevated temperature of 100° C., for example, such as a range from 110° C. to 220° C., which can be adjusted by varying the individual components, for example, the binder softens, and gases are given off. As a result of the gas-forming reaction, the softened binder is foamed and, above a further-elevated temperature of 200° C., for example, a vitreous ceramic is formed first of all, and with further-increasing temperature a true ceramic is developed. In the case of a system with a carbon layer, thermal exposure is first accompanied by development of a carbon layer, which at further-increased temperatures of 350° C., for example, develops into a vitreous ceramic; this vitreous ceramic increases the physical robustness of the carbon foam substantially. The reaction sequence can be described, therefore, as follows. As the temperature rises, first of all an acid is released. The acid reacts with the carbon-former. In parallel with this, the gas-forming reaction begins, and leads to an increase in volume. In the course of this procedure, the ceramic additives as well are distributed over the entire volume-increased layer. At a further-increased temperature, first a vitreous ceramic is formed, and at even higher temperatures develops into a true ceramic. An important point here is that the reactions coincide with the softening of the binder matrix. The protection which develops may be distinguished by development of a true ceramic from the ceramic-forming additives over the entire range.

With the inventive use of the fire-protection coating, more slender constructions are possible. For example, for an uncoated, load-bearing pine support, dimensions of 14/14 are required with fire protection necessitating an F30 configuration and dimensions of 12/12 being necessary from a structural engineering standpoint. If, on the other hand, the support is given the fire-protection coating, dimensions of 12/12 are a possibility.

The fire-protection coating described here is particularly advantageous in the context of fulfilling fire-protection requirements in building stock. For example, many multi-story buildings erected at the beginning of the 20th century have a wooden staircase. The entrance doors to the apartments are usually likewise in wood. Constructions of this kind in no way meet modern-day fire-protection requirements; nevertheless, preservation applies. As soon as the preservation is lifted, as a result, for example, of substantial renovations or conversions, massive conversions of the stairwell are required. In this case there have to date been two possible solutions: Either the wooden stairs are completely replaced, or, as a compensation measure, as part of a fire-protection concept, a complete sprinkler system is installed in the stairwell. In the case of the second solution, it will generally be necessary to back the staircase construction with fire-protection panels. Both solutions represent a massive intervention into the substance of the building, and alter the character of a building. A further factor is that both solutions entail considerable costs. With the inventive use of the fire-protection coating it is possible to bring a wooden stairwell up to fire-protection standards without massive intervention in the substance of the building, while at the same time preserving its constructional character. In comparison to those available previously, this solution is significantly less expensive and more rapid to implement. Similar considerations apply to wooden roof trusses or to other wooden structures in existing buildings.

The minimal intervention in the substance of a building predestines the above-described invention for future assurance of fire protection for historic buildings and cultural artifacts. In the preservation of monuments in particular, indeed, there is a very strong field of conflict between the requirements of fire protection and the claims of monument preservation. The use of fire-alarm and sprinkler systems is under criticism not only from the standpoint of constructional intervention. The installation of a sprinkler system harbors the risk in principle of water damage which under certain circumstances may cause greater destruction of cultural artifacts than a fire.

With the passing of the new German model building code it will in future be possible to erect multistory wooden buildings with up to five full stories. The effective fire-protection coating it requires, which shall protect the construction from catching light for more than 60 minutes, can be produced in accordance with the prior art only by cladding with gypsum plasterboard and gypsum fiberboard panels. This solution involves a high level of construction cost and complexity, and is problematic when settling is likely in the building. A further factor is that cladding hides the aesthetics of the wood material and the wooden construction. The inventive use of the coating, on the other hand, allows a simpler construction and has no problems with settling in buildings. A transparent version of the coating restricts the aesthetics of the wooden construction hardly at all.

EXAMPLE 1

Specimens measuring 90×230 cm were produced from industrial chipboard panels of grade V100, having a density of 400 kg/m$^2$ and a thickness of 1 cm.

The fire properties were characterized using a modified test according to DIN 4102 for materials in fire resistance class B 2. In contradistinction to the specified flame exposure time of 15 s, flame exposure was carried out for 10 minutes. After 10 minutes the extent of pyrolysis was determined in cross section, using a microscope, and the loss of mass from the samples using a balance. In the region of flame exposure, pyrolysis had after 10 minutes progressed throughout the sample's cross section. The loss of mass averaged 6%.

EXAMPLE 2

A sample produced as in Example 1 was given the fire-protection coating. The dry-film thickness of the coating was approximately 1 mm. The coating consisted of 6.2% by weight R45HT as polybutadiene resin 55.9% by weight a silicone microemulsion concentrate (Wacker SMK 2100)

13.7% by weight borax 9.9% by weight $B_2O_3$ 4.2% by weight $SiO_2$ 2.5% by weight $NH_4Cl$ 3.9% by weight $NaHCO_3$ 1.5% by weight $KAlSO_4$ 1.5% by weight ammonium pentaborate 0.6% by weight isophorone diisocyanate 0.1% by weight dibutyltin laurate After 10 minutes of flame exposure the extent of pyrolysis in cross section and the loss of mass of the samples were determined as described in Example 1. The loss of mass was less than 1%, and there was no pyrolysis of the wood component of the specimen.

EXAMPLE 3

Specimens measuring 100×200 cm were produced from industrial chipboard panels of the same grade as in Example 1, for fire shaft investigations in accordance with DIN 4102-4. In accordance with DIN standard, the investigations were terminated after 2 minutes, since the limiting criterion of the smoke-gas temperature was exceeded. For comparison, in a further experiment the termination criterion was ignored. The chipboard samples were completely consumed by combustion, with vigorous production of smoke and heat, within 7 minutes. Temperatures of up to 800° C. were measured in the smoke gas.

EXAMPLE 4

Specimens as in Example 3 were additionally provided with the fire-protection coating. The dry-film thickness of the coating was determined as being 1 mm. Within the 10-minute experimental period there was no burning and no development of flame at the surface. An investigation of the chipboard panel after the experiment showed that there had been no pyrolysis of the panel.

EXAMPLE 5

Specimens 1 m long were produced from a commercially customary cable of type NHXMH-J 3×2.5. These specimens were coated with a variant of the fire-protection coating:

13.2% by weight Beetle Resin BIP PT338

4.0% by weight Beetle Resin BIP PT970

6.6% by weight Madurit 320

2.0% by weight Antiblaze VA490

20.0% by weight Bakelite PF 7086DL 14.8% by weight ammonium polyphosphate (Exolite APP422)

13.9% by weight $Al(OH)_3$ 2.8% by weight $TiO_2$ 3.7% by weight melamine 4.6% by weight ammonium pentaborate 27.8% by weight partial phosphoric ester (Budit 380)

4.6% by weight distilled water

The dry-film thickness of the coating was adjusted to 0.5 mm. The coated samples were investigated for their fire behavior in accordance with DIN VDE 0250-215 (VDE 0250 part 215):2002-04. No flame spread was found at the surface. In the region of flame exposure, no pyrolysis of the cable insulation was found beneath the fire-protection coating.

The invention claimed is:

1. A composition for a fire-protection agent for materials, characterized in comprising ceramic-forming additives and volume-formers, whereby in the event of heating, a volume of a layer formed by the fire-protection agent is increased by at least 500% in volume, and wherein at least the ceramic-forming additives and the volume-formers are present in nanoparticle-coated form.

2. The composition of claim 1, wherein said composition comprises at least two ceramic-forming additives.

3. A composition for a fire-protection agent for materials, characterized in comprising ceramic-forming additives and volume-formers, the combination of ceramic-forming additives and volume-formers being such as to provide, in the event of heating, a volume of a ceramic layer formed by the fire-protection agent that is increased by at least 500% in volume, and wherein the ceramic-forming additives and the volume-formers are present as salts having a particle size of 1 to 50 μm.

4. The composition of claim 3, wherein said composition comprises at least two ceramic-forming additives.

5. A method of producing a fire protection agent, characterized in that ceramic-forming additives are added to a volume forming fire-protection agent, whereby the ceramic-forming additives in the volume-forming fire-protection agent are present as nanoparticle-coated salts.

6. The method of claim 5, wherein said ceramic-forming additives comprise at least two ceramic-forming additives.

7. A composition for a fire-protection agent for materials, characterized in comprising ceramic-forming additives and volume-formers, the combination of ceramic-forming additives and volume-formers being such as to provide, in the event of heating, a volume of a ceramic layer formed by the fire-protection agent that is increased by at least 500% in volume, characterized in that the ceramic-forming additives are disodium tetraborate and ammonium pentaborate.

* * * * *